US008015196B2

(12) United States Patent
Taranenko et al.

(10) Patent No.: US 8,015,196 B2
(45) Date of Patent: Sep. 6, 2011

(54) GEOGRAPHIC FEATURE NAME SEARCH SYSTEM

(75) Inventors: Alexandre Taranenko, Silver Spring, MD (US); Inessa Taranenko, Silver Spring, MD (US)

(73) Assignee: Geographic Services, Inc., McLean, VA (US)

( * ) Notice: Subject to any disclaimer, the term of this patent is extended or adjusted under 35 U.S.C. 154(b) by 348 days.

(21) Appl. No.: 12/155,920

(22) Filed: Jun. 11, 2008

(65) Prior Publication Data

US 2008/0319990 A1  Dec. 25, 2008

Related U.S. Application Data

(60) Provisional application No. 60/944,739, filed on Jun. 18, 2007, provisional application No. 60/944,752, filed on Jun. 18, 2007.

(51) Int. Cl.
*G06F 17/30* (2006.01)
*G06F 7/00* (2006.01)

(52) U.S. Cl. ........................................ 707/758; 707/736
(58) Field of Classification Search .................. 707/736, 707/758, 999.5
See application file for complete search history.

(56) References Cited

U.S. PATENT DOCUMENTS

| | | | |
|---|---|---|---|
| 4,998,280 A * | 3/1991 | Amano et al. | 704/254 |
| 5,212,730 A | 5/1993 | Wheatley et al. | |
| 5,265,065 A | 11/1993 | Turtle | |
| 6,442,544 B1 | 8/2002 | Kohli | |
| 6,487,495 B1 | 11/2002 | Gale et al. | |
| 6,504,571 B1 | 1/2003 | Narayanaswami et al. | |
| 6,678,694 B1 | 1/2004 | Zimmermann et al. | |
| 6,963,871 B1 | 11/2005 | Hermansen et al. | |
| 7,054,741 B2 | 5/2006 | Harrison et al. | |
| 7,096,216 B2 | 8/2006 | Anonsen | |
| 7,096,226 B2 | 8/2006 | Brock et al. | |
| 7,117,199 B2 | 10/2006 | Frank et al. | |
| 7,200,489 B2 | 4/2007 | Bramley | |
| 7,257,570 B2 * | 8/2007 | Riise et al. | 707/706 |
| 7,289,956 B2 * | 10/2007 | Yu et al. | 704/240 |
| 7,440,746 B1 * | 10/2008 | Swan | 455/412.1 |

(Continued)

FOREIGN PATENT DOCUMENTS

CN 101026676 A 1/2007

(Continued)

OTHER PUBLICATIONS

Fu, Gaihua, et al., "Building a Geographic Ontology for Intelligent Spatial Search on the Web", Proc. of the IASTED International Conf. on Databases and Applications, Innsbruck, Austria, Feb. 14-16, 2005, pp. 167-172.*

(Continued)

*Primary Examiner* — Robert Stevens
(74) *Attorney, Agent, or Firm* — Reed Smith LLP

(57) ABSTRACT

A computer-based software tool for performing intelligent searches for geographic names data utilizing a fuzzy-logic search as well as linguistic principles and allowing the user to select various search criteria is disclosed. Geographic feature names can be searched for exact matches, similar geographic names based on misspellings or phonetic similarities, similar geographic names based on language dialects, historic place name variants, features with similar name Romanization, similar names with the type of feature, such as city, river, or mountain included in the name, in reversed or reading order, and similar names with inconsistent Unicode. With the aid of a displayed geographic map, the search can be localized.

22 Claims, 14 Drawing Sheets

U.S. PATENT DOCUMENTS

| | | | |
|---|---|---|---|
| 7,483,894 B2* | 1/2009 | Cao | 1/1 |
| 7,849,071 B2* | 12/2010 | Riise et al. | 707/708 |
| 2002/0010714 A1 | 1/2002 | Hetherington | |
| 2002/0107918 A1* | 8/2002 | Shaffer et al. | 709/203 |
| 2002/0133344 A1* | 9/2002 | Damiba | 704/247 |
| 2002/0138494 A1* | 9/2002 | Damiba | 707/102 |
| 2002/0193997 A1* | 12/2002 | Fitzpatrick et al. | 704/270 |
| 2003/0167253 A1 | 9/2003 | Meinig | |
| 2003/0210825 A1 | 11/2003 | Friederich et al. | |
| 2003/0225725 A1 | 12/2003 | Miller et al. | |
| 2004/0083214 A1 | 4/2004 | Hsieh et al. | |
| 2004/0117182 A1* | 6/2004 | Downey | 704/243 |
| 2004/0177077 A1 | 9/2004 | Steele | |
| 2004/0243407 A1* | 12/2004 | Yu et al. | 704/240 |
| 2005/0108213 A1* | 5/2005 | Riise et al. | 707/3 |
| 2005/0273468 A1 | 12/2005 | Hermansen et al. | |
| 2006/0004730 A1 | 1/2006 | Chan | |
| 2006/0031239 A1* | 2/2006 | Koenig | 707/100 |
| 2006/0217878 A1* | 9/2006 | Bramley | 701/207 |
| 2006/0259294 A1* | 11/2006 | Tashereau | 704/10 |
| 2007/0005567 A1 | 1/2007 | Hermansen et al. | |
| 2007/0198951 A1 | 8/2007 | Frank | |
| 2007/0208683 A1* | 9/2007 | Geilich | 707/1 |
| 2007/0260595 A1 | 11/2007 | Beatty et al. | |
| 2007/0273558 A1 | 11/2007 | Smith et al. | |
| 2007/0273758 A1 | 11/2007 | Mendoza et al. | |
| 2007/0276845 A1* | 11/2007 | Geilich | 707/100 |
| 2007/0288436 A1* | 12/2007 | Cao | 707/3 |
| 2008/0016055 A1* | 1/2008 | Riise et al. | 707/5 |
| 2008/0019496 A1* | 1/2008 | Taschereau | 379/218.01 |

FOREIGN PATENT DOCUMENTS

| | | |
|---|---|---|
| CN | 101026676 | 8/2007 |
| TW | 200736941 | 3/2006 |
| TW | 200736941 | 10/2007 |

OTHER PUBLICATIONS

Kanada, Yasusi, "Axis-specified Search: A Fine-grained Full-text search Method for Gathering and Structuring Excerpts", DL '98, Pittsburgh, PA, © 1998, pp. 108-117.*

Jones, Christopher B., et al., "The SPIRIT Spatial Search Engine: Architecture, Ontologies and Spatial Indexing", GIScience 2004, LNCS 3234, Springer-Verlag, Berlin, Germany, © 2004, pp. 125-139.*

Thompson, Paul, et al., "Name Searching and Information Retrieval", Proc. of the 2nd Conf. on Empirical Methods in Natural Language Processing, © 1997, pp. 134-140.*

Lee, R., et al., "Map-Based Range Query Processing for Geographic Web Search Systems", Digital Cities 2003, LNCS 3081, Springer-Verlag, Berlin, Germany, © 2005, pp. 274-283.*

Wang, Fangju, "A Fuzzy Grammar and Possibility Theory-based Natural Language User Interface for Spatial Queries", Fuzzy Sets and Systems, vol. 113, Issue 1, Jul. 1, 2000, pp. 147-159.*

Jones, Christopher B., et al., "maintaining Ontologies for Geographical Information Retrieval on the Web", CoopIS/DOA/ODBASE 2003, LNCS 2888, Springer-Verlag, Berlin, Germany, © 2003, pp. 934-951.*

Cross, Valerie, et al., "Fuzzy Objects for Geographical Information Systems", Fuzzy Sets and Systems, vol. 113, Issue 1, Jul. 1, 2000, pp. 19-36.*

Pirkola, Ari, et al., "Dictionary-Based Cross-Language Information Retrieval: Problems, Methods and Research Findings", Information Retrieval, vol. 4, Nos. 3-4, Kluwer Academic Publishers, The Netherlands, Sep. 2001, pp. 209-230.*

Leveling, Johannes, et al., "University of Hagen at GeoCLEF 2005: Using Semantic Networks for Interpreting Geographical Queries", Working Notes for the GeoCLEF 2005 Workshop, © 2005, pp. 1-10.*

Jones, Christopher B., et al., "Graphical Terminology Servers—Closing the Semantic Divide", Perspectives on Geographic Information Science, Taylor & Francis, © 2002, pp. 1-20.*

Microsoft Computer Dictionary, 5th Edition, Microsoft Press, Redmond, WA, © 2002, p. 368.*

Kraft, Donald H., et al., "Fuzzy Information Systems: Managing Uncertainty in Databases and Information Retrieval Systems", Fuzzy Sets and Systems, vol. 90, Issue 2, Sep. 1, 1997, pp. 183-191.*

Dalmau, Michelle, et al., "Integrating Thesaurus Relationships into Search and Browse in an Online Photograph Collection", Library Hi Tech., vol. 23, No. 3, Jan. 2005, pp. 425-452.*

Golding, Andrew R., et al., "A comparison of Anapron with seven other name-pronunciation systems", Mitsubishi Electric Research Laboratories Technical Report No. MERL-TR-93-05a, May 1996, pp. i-ii and 1-21.*

Tim Waters et al., "Tools for Web-Based GIS Mapping of a 'Fuzzy' Vernacular Geography", Centre of Computational Geography, Leeds University, Leeds, UK., 4 pages, 2008.

Raghu Krishnapuram et al., "Content-Based Image Retrieval Based on a Fuzzy Approach", IEEE Transactions on Knowledge and Data Engineering, vol. 16, No. 10, Oct. 2004, pp. 1185-1199.

International Search Report dated Sep. 25, 2008 regarding International Application No. PCT/US 08/07265, 4 pages.

"ArrcGIS 9: Geocoding Rule Base Developer Guide", 2003, pp. 1-167, URL:http://webhelp.esri.com/arcgisdesktop/9.1/pdf/Geocoding_Rule_Base_Developer_Guide.pdf.

Cohen, W.W., et al., "A Comparison of String Distance Metrics for Name-Matching Tasks", 2003, pp. 1-6, URL:http://www.cs.cmu.edu/wcohen/postscript/ijcai-ws-2003.pdf.

Extended European Search Report dated Sep. 17, 2010 for corresponding European Patent Application No. 08768323.1 (corresponds to PCT/US2008/007265), 10 pages.

Tim Waters, et al., Tools for Web-Based GIS Mapping of a "Fuzzy" Vernacular Geography, Centre for Computational Geography, School of Geography, University of Leeds, Leeds, UK, pp. 1-10, Mar. 21, 2011.

Raghu Krishnapuram, et al., Content-Based Image Retrieval Based on a Fuzzy Approach, IEEE Transactions on Knowledge and Data Engineering, vol. 16, No. 10, Oct. 2004, pp. 1185-1199.

* cited by examiner

| á | a acute accent | E1 | 61+341 |
|---|---|---|---|
| ş | s cedilla | 15F | 73+327 |

$$\left.\begin{array}{l}\text{á=E1}\\\text{á=61+341}\end{array}\right\}\text{á=E1} \qquad \left.\begin{array}{l}\text{ş=15F}\\\text{ş=73+327}\end{array}\right\}\text{ş=15F}$$

GEOGRAPHIC FEATURE NAME SEARCH SYSTEM

CROSS REFERENCE TO RELATED APPLICATIONS

This application is nonprovisional application of Provisional Application No. 60/944,739 filed on Jun. 18, 2007 and Provisional Application No. 60/944,752 filed on Jun. 18, 2007. Priority is claimed based upon Provisional Application No. 60/944,739 filed on Jun. 18, 2007 and Provisional Application No. 60/944,752 filed on Jun. 18, 2007.

BACKGROUND

1. Technical Field

This invention is in the technical field of geographic information systems, more specifically those systems involved with geographic names data commonly referred to as "Geonames."

2. Background

Geographic name data has traditionally been stored in the form of large hard copy editions called gazetteers. The industry has now moved in the direction of databases to allow Web-based access and more usable search features. Geographic names databases contain information, including geographic place names, location coordinates, and any amount of associated feature data and metadata. These forms of databases are compiled and maintained by numerous government bodies including the United States Geological Survey (USGS) for domestic data and National Geospatial-Intelligence Agency (NGA) as well as other agencies and private geographic companies. This data is used for purposes ranging from map production to defense intelligence.

Geonames data storage and retrieval pose a number of unique challenges compared to other types of database information. Proper retrieval often requires knowledge of the exact place name spelling, as well as information about uniquely geographic metadata such as geographic location and feature type. Available database search engines are known for being unforgiving with their search options. For example, a search as simple as "Mexico" may come up with no search results because this place name is stored as "México". When searches are extended to place names with multiple name parts including a generic feature type, this becomes even more cumbersome. Additionally, there are many place names that are identical without additional location information (e.g., Springfield, Virginia and Springfield, Ill.) or without information regarding feature type (e.g., Potomac River and Potomac, Md.).

Generic geographic feature names (e.g. river, stream, city, road etc.) complicate geographic searches. To retrieve information about a feature of interest, a search engine user would need to know the feature name used in the database (e.g., stream not river) as well as use the correct native language or dialect for this term. Names are generally collected in the native language in Romanized form. While name Romanization nominally follows some sort of standardization, there are multiple systems for Romanization of particular languages (e.g., MOCT or McHune Reicheur for Korean) and more than one standardization body (e.g., the U.S. Board of Geographic Names and the International Board of Geographic Names). This is compounded by human fallibility and judgments that must be made regarding pronunciation.

Like all other parts of language, geographic names and terms evolve. Geographic names are particularly susceptible to change over time because of the political nature of place names. Place names often change with the party or leader in power for reasons of language change or political use (e.g., Istanbul/Constantinople). To properly identify a place, a Geonames database user may need to be able to identify this feature by a historic variant of the name that may be completely different linguistically.

SUMMARY

The invention provides a computer-based software tool for performing intelligent searches for geographic names data. It utilizes a fuzzy-logic search as well as linguistic principles and allows the user to select flexible search criteria.

The computer is programmed to search geographic feature names for, among others, exact matches, similar geographic names based on misspellings or phonetic similarities, similar geographic names based on language dialects, historic place name variants, features with similar name Romanization, similar names with generics (type of feature such as city, river, or mountain included in the name) in reversed or reading order, and similar names with inconsistent Unicode.

The program can search an entire database of geographic names in its entirety or focus on specific geographic areas. This is implemented with the aid of a geographic map that is displayed to the user and superimposed with the location of geographic feature names. In one embodiment, the program will search for similar feature names within a customizable distance. In a preferred version, this distance is measured in decimal degrees of Earth latitude and longitude.

The invention quantifies the degree of similarity. In a preferred version, the degree of similarity is expressed as a percentage, with 100% indicating exact matches. Fuzzy logic is used to determine smaller percentages indicating lower levels of spelling similarities. In addition to misspellings, the invention can take into account phonetic similarities, i.e., look for similar phonemes. Both spelling and phonetic searches can be refined by the user's selection of a particular language or even dialect. This leads to looking for reversed order of generics in the geographic name.

In a preferred version, the search criteria can be set to limit the search to geographic names of specific geographic feature types, such as cities, rivers, mountains, etc. As an alternative, the search criteria can include a broader class of related feature types.

Finally, the user can specify a threshold level of similarity that must be reached to be included in displayed search results.

DETAILED DESCRIPTION OF THE PREFERRED EMBODIMENTS

Figure 1:
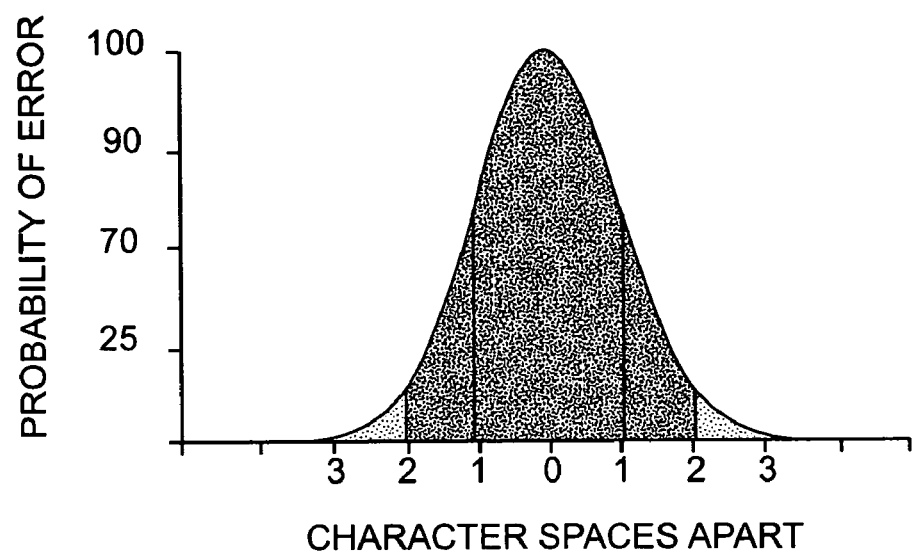
FIG. 1 is a graph indicating a general Gaussian distribution of random errors occurring in names.

Definitions:

It will be useful to define some terms as follows:

A geographic feature is a user defined inanimate object of interest to a user having a fixed location on a map. This include natural phenomenon (rivers, lakes), man made structures, and geopolitical subdivisions.

A geographic feature type is a formal user defined characterization of a feature, e.g., River, City, Building.

A designation code is a user defined code designating a feature type, e.g., STM for stream.

A geographic feature type class is a user defined collection of related types, e.g., Hydraulic, Populated Area.

A geographic name is a string of symbols (characters, see below) identifying a geographic feature. The name need not have any other independent meaning, although many do, e.g., New York City, Potomac River, etc. Occasionally, a geographic name may be similar to the name of a person, e.g., John F. Kennedy Boulevard, but this invention treats the name as a string of characters without regard to surnames, titles, or another aspect of a person's name. The character string can include spaces.

A generic is herein defined as a geographic feature type used as part of the name, e.g., River in Potomac River.

Phonetic means of or pertaining to speech sounds.

A phoneme is any of a set of speech units that could indicate a difference in meaning, usually represented by the symbols of the International Phonetic Alphabet.

A diacritic is an additional mark located near phonetic symbols providing additional representation for modulations of the phoneme.

A language is a system of linguistic signs or symbols, herein, used in the abstract.

A dialect is a language that is part of a group of related dialects, often referred to as a dialect of a language, based on an historical derivation.

Romanized means rendered using characters (letters) from the Latin alphabet to represent languages that use different characters, especially, Chinese, Japanese, etc.

Characters are discrete symbols capable of being represented as a binary number of reasonable size, typically 16 bits or less.

Character position means the position of a character in a string, typically numbered from the first character.

Unicode is a character encoding standard (ISO 10646) the uses 16 bits (allowing 65,536 distinct variations) to represent characters from most World languages including Chinese, Japanese, etc. Characters are formally specified in the format "U+ABCD" where A, B, C, and D are hexadecimal numbers. (ASCII is a 7 bit subset limited to 128 characters.) Herein, the U+ and leading zeros will be omitted where the context is clear.

Latitude and Longitude have their ordinary meaning and coordinates means the coordinates of a point on a map using latitude and longitude, unless otherwise stated.

Detailed Overview:

The invention addresses the issues raised in the Background in a number of ways. It utilizes a fuzzy logic search to find names that may be misspelled either in the database or in the search query (eg. Kalam/Kalak) or are phonetically similar Romanizations because of a difference in pronunciation or Romanization standard (Kalam/Khalam). The invention associates similar phonemes within languages (eg. "k"/"kh" or "gh"/"q" in Farsi) to allow the fuzzy logic to extend beyond simple character recognition. A software program accounts for the location of geographic features by allowing a user to select a specific search area as well as displaying search results on a coverage map. Since these features are connected to a geographic database, users can easily access additional feature data and metadata. Within standard Geonames databases, features are linked by Unique Feature Identifications (UFI) as well as by Unique Name Identifications (UNI). This UFI linkage allows the program to link historic names with current names for search and display purposes.

The invention search process extends beyond the geographic name to any generics within the name. The search recognizes the fact that many databases use a reversed generics order instead of the standard reading order (Washington, Mount instead of Mount Washington). There is also a difference of generic term/feature name order depending on the grammatical stipulations of specific languages. The fuzzy search compares words in both orders to account for these cases. The invention also takes into account the need to search generics beyond the specific term in the database or query. For example, a search for "_____ mountain" should also include similar generics such as "mountain range", "peak", "mountains", and "summit" as well as these words in other languages or dialects spoken in or near the area of interest. This is vital for cases where the source for a search query is from a different language than the database source (e.g., an Arabic source provides "Puladi jebal" for the same mountain in Iran "NMI lciih").

Similarity Procedures:

The ultimate in similarity occurs when two geographic names are identical, character by character. A search on this criterion alone can be useful to find different geographic features with the same name. Also, the same geographic feature may have the same name, but be designated by two different feature types. However, greater utility is obtained by looking for names that are similar, though not identical. In this case, some weight must be attached to the degree of similarity.

The most common typing error is believed to be a character reversal. Although this does not account for all errors, the probability of being misplaced by more than two spaces should be quite small. Assuming random errors, this could be modeled with a Gaussian distribution. This is illustrated generally in FIG. 1. However, for this invention, based on experimental testing, an even simpler weighting method was adopted. A weight of 100% is given to characters that match and 90% to those that are shifted by one character position. All other shifts are given a weight of 0%., i.e., not counted.

Figure 1A:
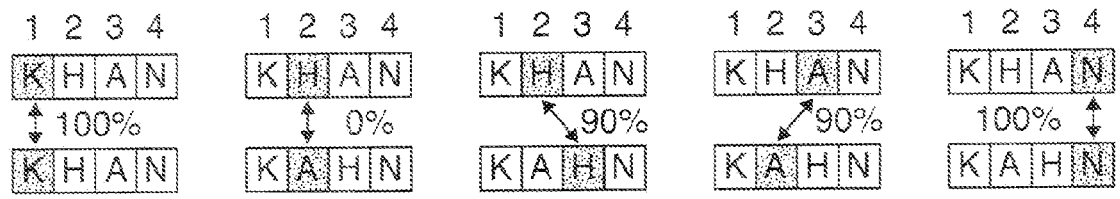
FIG. 1A illustrates an example of a comparison and weighting of characters for the words KHAN and KAHN.

FIG. 1A is an example of a comparison and weighting of characters for two short words, KHAN and KAHN. The characters in KHAN are compared, position by position and a weight assigned. The degree of similarity is simply calculated as (100+90 +90 +100)/4=95%.

Figure 1B:
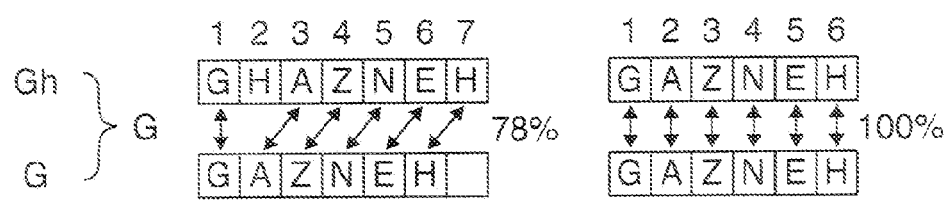
FIG. 1B illustrates an example of an increased similarity of two words realized with phoneme replacement.

One fairly common error results from incorrect characterization of phonemes. For example, when Romanizing Farsi text, "Gh" is often used when the correct Romanization is "G". The extra "h" would yield dissimilarities where none existed. Based on a database of common errors for each dialect, it is possible to recognize these errors and make the correct substitution, FIG 1B shows how the similarity increases from 78% to 100. (Note that the length of the longer string, 7, is used as the divisor.) As can he easily understood, this is more important for shorter words.

Figures 1C, 1D:
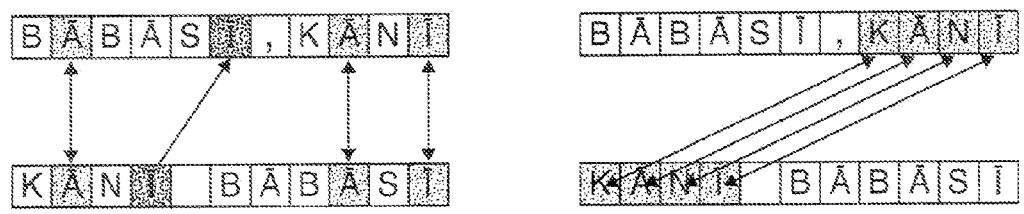
FIG. 1C illustrates examples of inconsistent unicode representations of various characters.
FIG. 1D illustrates examples of generics.

Another concern for search queries occurs when characters are inconsistently represented in he underlying Unicode. (All characters are represented in Unicode out of necessity.) Based on another database of common Unicode errors for different dialects, it is possible to compare and correct these. FIG. 1C illustrates two different situations. For example, "a acute accent" can be represented by the accepted standard of "El" or alternately by the sequence "61+341". The program must recognize these two as identical characters. A second example of Unicode discrepancy could occur where an attempt to represent §, for example, as a cominbination of a Latin s (73) and the Unicode (327) for COMBINING CEDILLA is used instead of the correct "15F".

Although not an error per se, another common occurrence is a reversal of a geographic name and the generic feature type. In some languages, the generic precedes the name, e.g., River Jordan instead of Jordan River. As FIG 1D illustrates, a comparison on this basis would be entirely inaccurate. When this factor is added into the search, one can now accurately compare the generic and proper name portions of the word.

FIGS. 2-9 are screenshots illustrating user interactions with the computer based system. These figures assume a direct connection via a keyboard and display. It should be relatively straightforward to enable the user to be remotely connected via the Internet.

Create Master File:

The first action required is to gather information and create a master file for later use. Geographic name databases may be obtained in several formats. However, a popular one is in the form of Excel® (Microsoft Corporation) spreadsheets. These correspond to square map sheets and contain data on geographic features, locations, names, type and other information in tabular form. In principal, the master file could be created by specifying spreadsheets by number. Another method is to select areas on a map. There are a number of ways to accomplish this, but something like the following should be practical.

Figure 2:
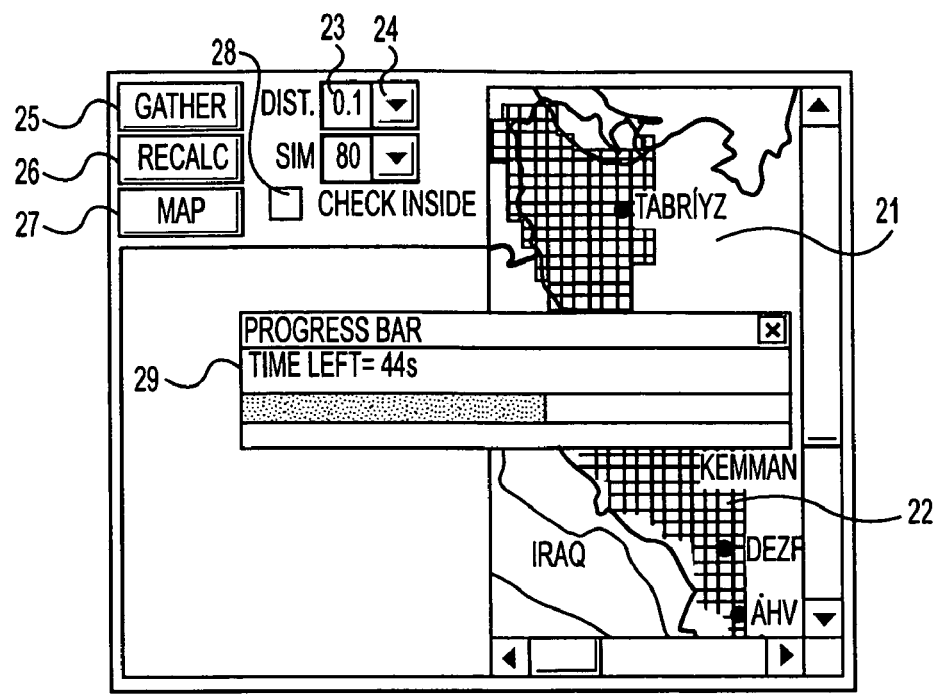
FIG. 2 is a computer screenshot illustrating a map area and several user inputs.

FIG. 2 illustrates a computer screenshot with a map area and several user inputs. Map area 21 shows a region of interest. Using a mouse pointer, the user can click on points on the map. Each time, a map sheet square 22 will be outlined. In some embodiments, the user may be interested in the boundary areas between map sheets where errors are more likely to occur. If so, the user can input a distance from boundary 23. If left blank, the default is no restriction. For later use, percentage of similarity between names can be specified by the similarity input 24. The last option is to click a check inside box 28. This limits the system from checking across map sheets, but is not normally used. When the user is finished, pressing the "Gather" button 25 will gather the individual sheets into a master file. If changes are desired, squares can be added or deleted without reprocessing the entire file by pressing the "Recalc" button 26. Pressing the "Map" button 27 shows all the available map sheets on the map view area. Progress bar 29 shows the time remaining to gather the master file.

Figure 3:
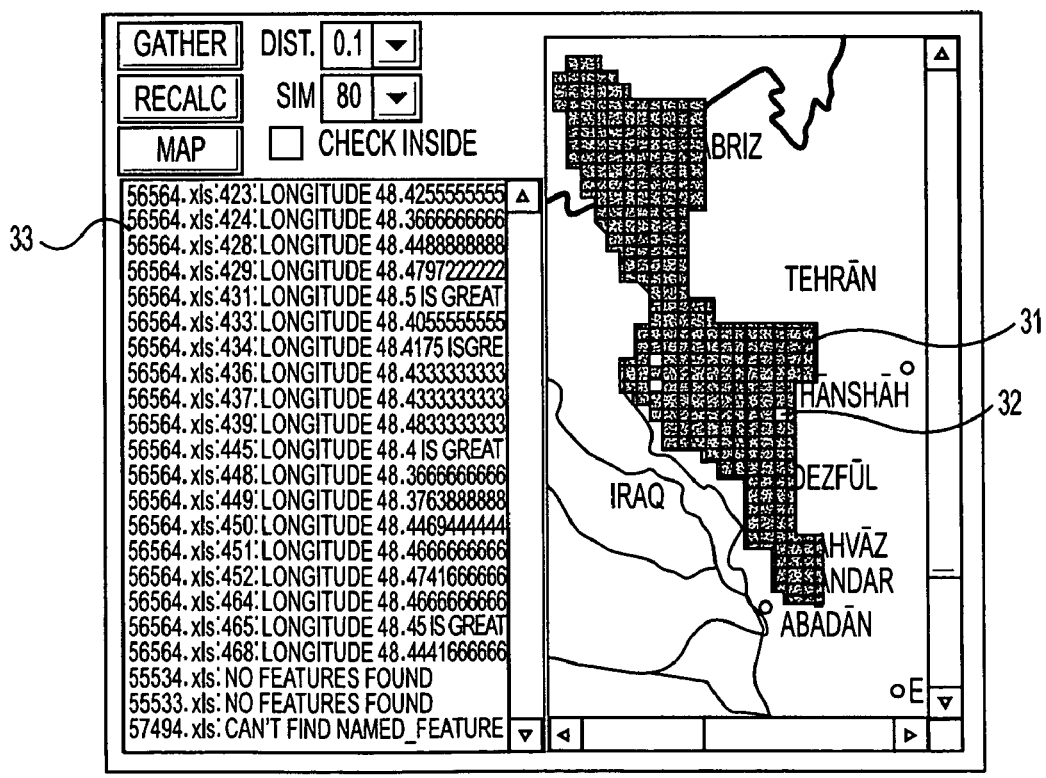
FIG. 3 is a screenshot illustrating a display of gathered map sheets.

FIG. 3 illustrates a display of all map sheets gathered 31. Those with no geographic features are highlighted 32. A listing of Excel spreadsheets is provided 33.

Use of the System:

FIGS. 4-10 illustrate an opening screen presented to the user. From left to right on the top right of the display above a displayed map 41, "Zoom to Full Extent" button 42a allows the user to zoom to the full extent of the geo-referenced images, "Zoom Out" button 42b allows the user to zoom out in 10% increments, and "Zoom In" button 42c allows the user to zoom in 10% increments. "Zoom Raster Resolution" button 42d allows a user to zoom up to the resolution of the map. "Cursor" button 42e allows the user to move a mouse pointer across the map 41 and display latitude and longitude as show in latitude display box 43a and longitude display box 43b. "Pan" button 42f allows the user to pan the view across the map window 41. "Rubber Box" button 42g allows the user to paint a rectangle on the map 41 for enlargement.

Generic Input drop down box 44a allows the user to type in a geographic feature type and view the synonymous or related feature types stored in a glossary. These are displayed in Generic display area 45a. Alternatively, if synonyms are displayed, they can be selected from display area by double mouse clicking.

Query Name Input box 44b allows the user to enter a geographic feature name and start a search by pressing the "Go" button 42h. The result of the search appears in Search Result display are 45b. Once displayed, a double mouse click will select one from the search results or select one from a list displayed below it.

Figure 4:
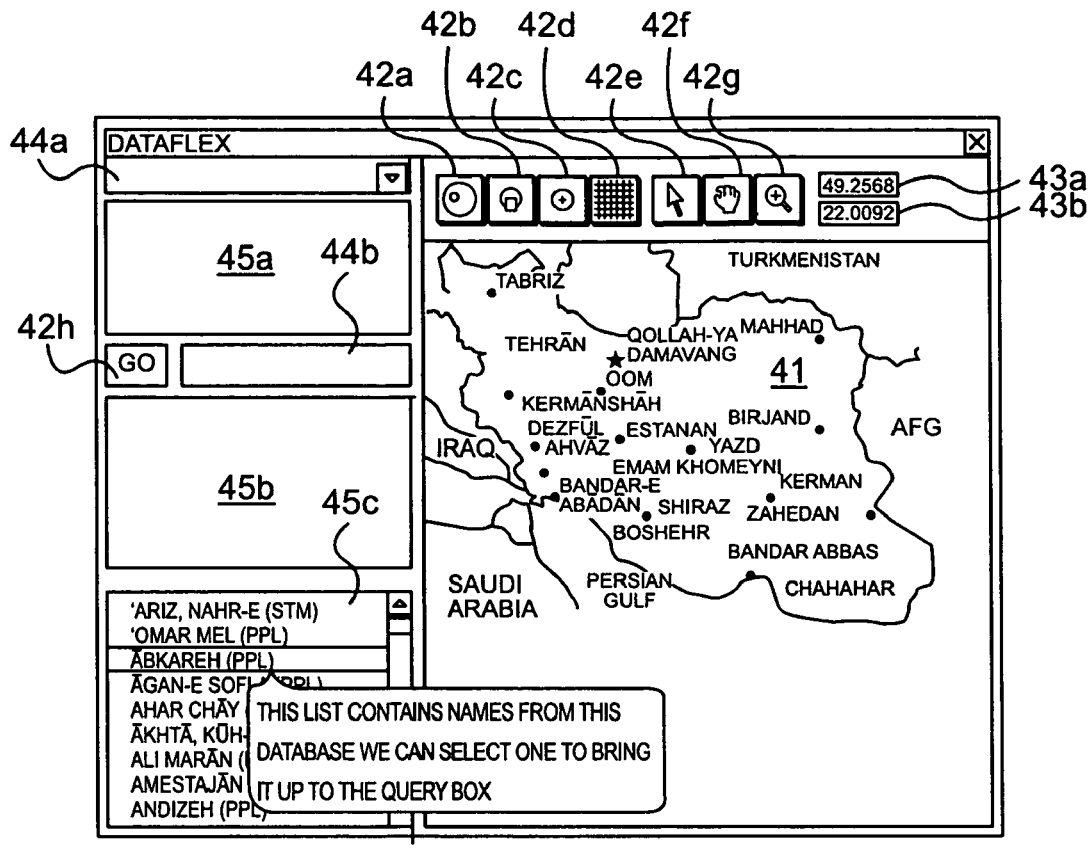
FIG. 4 is a screenshot of the opening screen for geographic name search.

In FIG. 4, Database Names are displayed in display areas 45c. Double mouse clicking will bring it up to the Query box 44b. The list shown is all the names in the database in use. The names are listed in alphabetical order. Associated with each name is a designation code for the geographic feature code. For example STM designates a stream, PPL a populated place, and MT a mountain. These codes are based on standards from the National Geospatial-Intelligence Agency. However, other codes could be used.

In discussing FIGS. 5-10, the buttons, inputs and displays are the same as in FIG. 4 and the numeral designations will not be repeated to better point out the ones that are being used in the figure under discussion.

Figure 5:
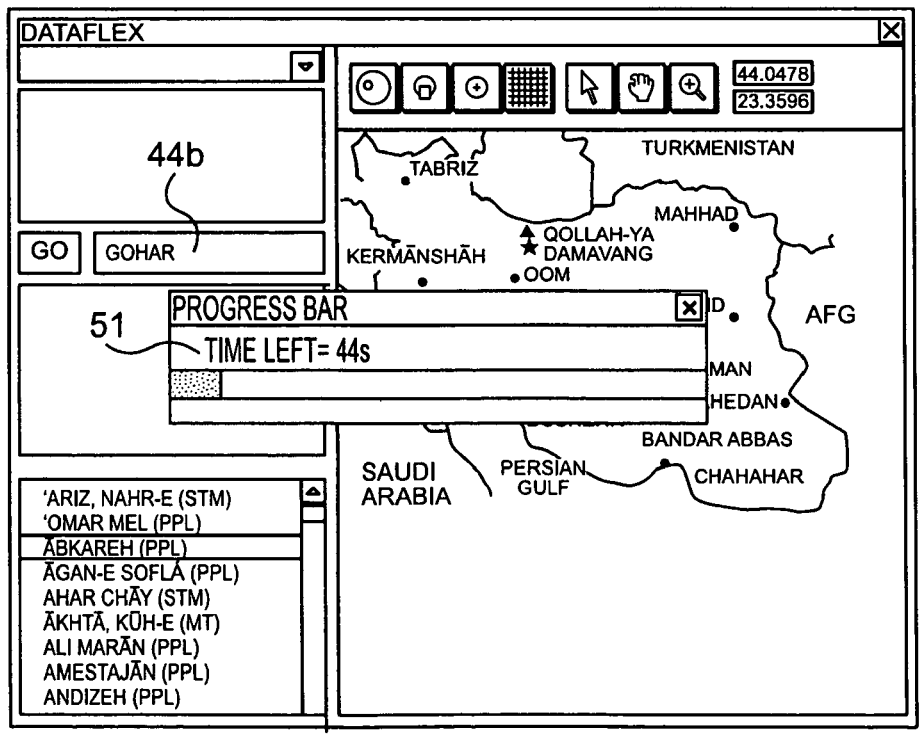
FIG. 5 is a screenshot following FIG. 4 illustrating entry of a query name, "gohar"

FIG. 5 illustrates entry of a name string, "gohar," in the query box 44b that is not necessarily selected from a name in the glossary box below. (The highlight of the name All Maran is an artifact from producing screenshots.) The system then searches the database in use and "Progress Bar" 51 indicates graphically the percentage completion.

Figure 6:
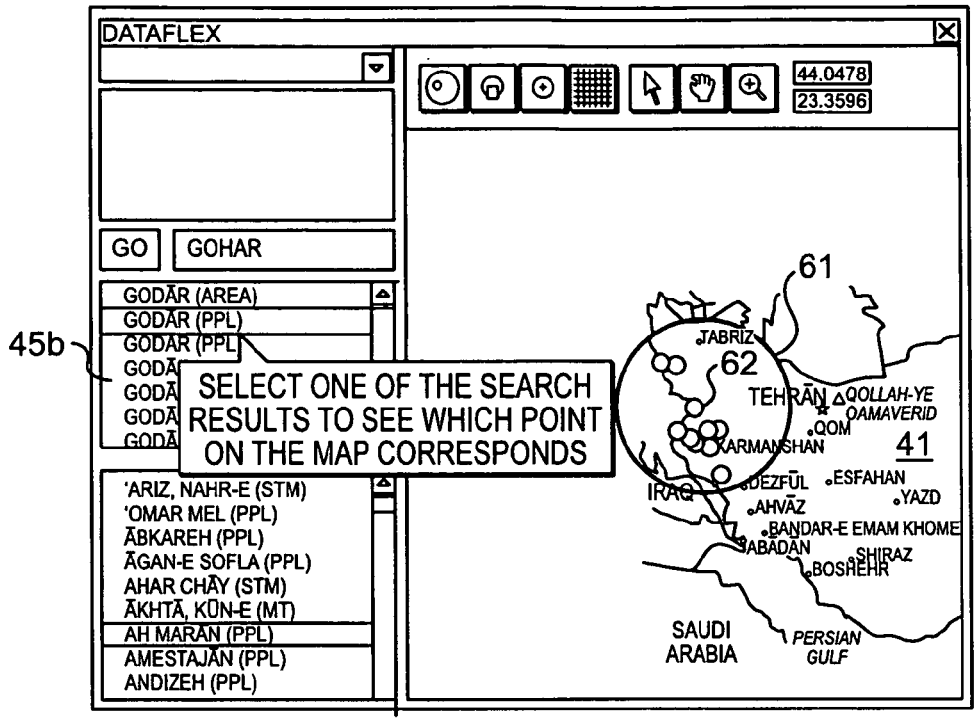
FIG. 6 is the screenshot following FIG. 5 illustrating search results as a list of geographic names with map locations indicated.

In FIG. 6, a list of geographic names that exceeded a similarity percentage set by the user is shown in display area 45b in order of the highest percentage. In this example, the most similar name is "god r;" there are no "gohar"s. The type designation code is also displayed. (AREA means a general unpopulated area.) The small circles (green on a color display) within the larger circle 61 (superposed for the purposes of illustration) on the map 41 show the location of all names in the results box 45b. The location on the map of a particular named geographic feature can be found by highlighting it. The dark circle 62 (blue on a color display) shows its location. The map can be re-centered by double clicking on one of the name location circles.

Figure 7:
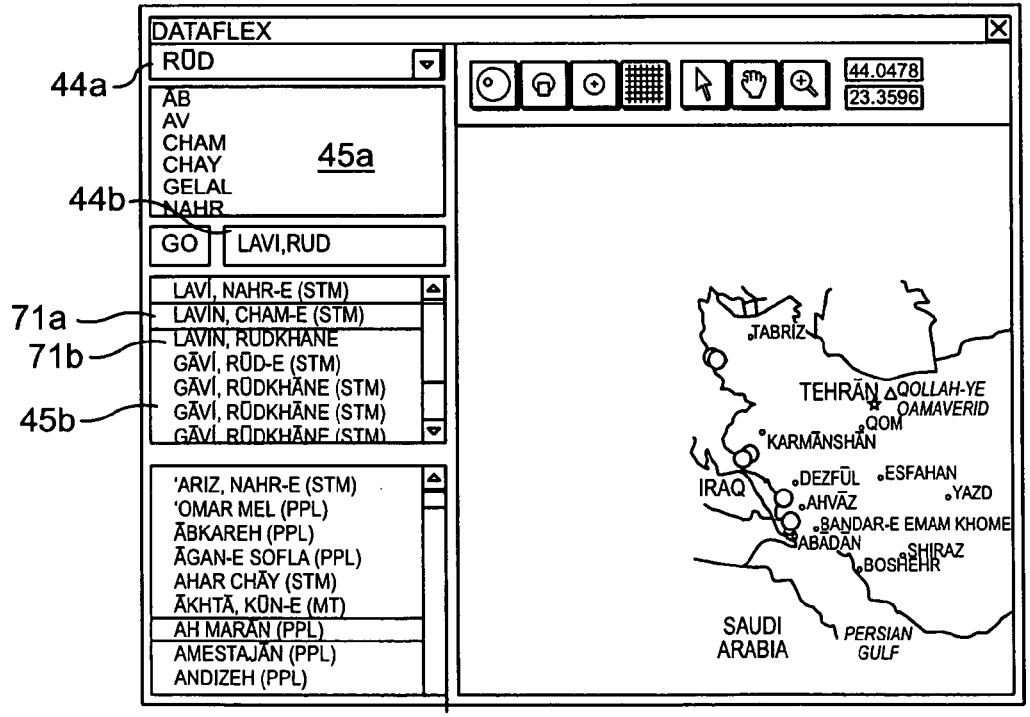
FIG. 7 is a screenshot following FIG. 4 illustrating entry of a query name, "lavi" and query type, "rud" with results including alternative spellings of the type.

FIG. 7 illustrates a new search for a particular type using the language of the database in use. In this case the database will search for similar names to the feature name "lavi" and the generic "rud" (stream). The results are shown in results display area 45b. In the case the results box displays a list of similar names, e.g., "laving" and "gavi." However, the names are limited to those attached to the same generic. These also correspond with classification codes, in this case, STM, being the same. Two entries, "Lavin,Cham" 71a and "Lavin,Rudkahaneh" 71b have identical names. In Farsi, "Rudkahaneh" is a generic term for "river". However, "cham" is the Turkish word for river. The generic results box 45a indicates equivalent terms to "rud" (another Farsi word for river) in a number of dialects, in this case, Farsi, Arabic, Turkish, Kurdish, and various others in the loaded dictionary. Their geographic locations are also shown by the small circle on the map.

Figure 8:
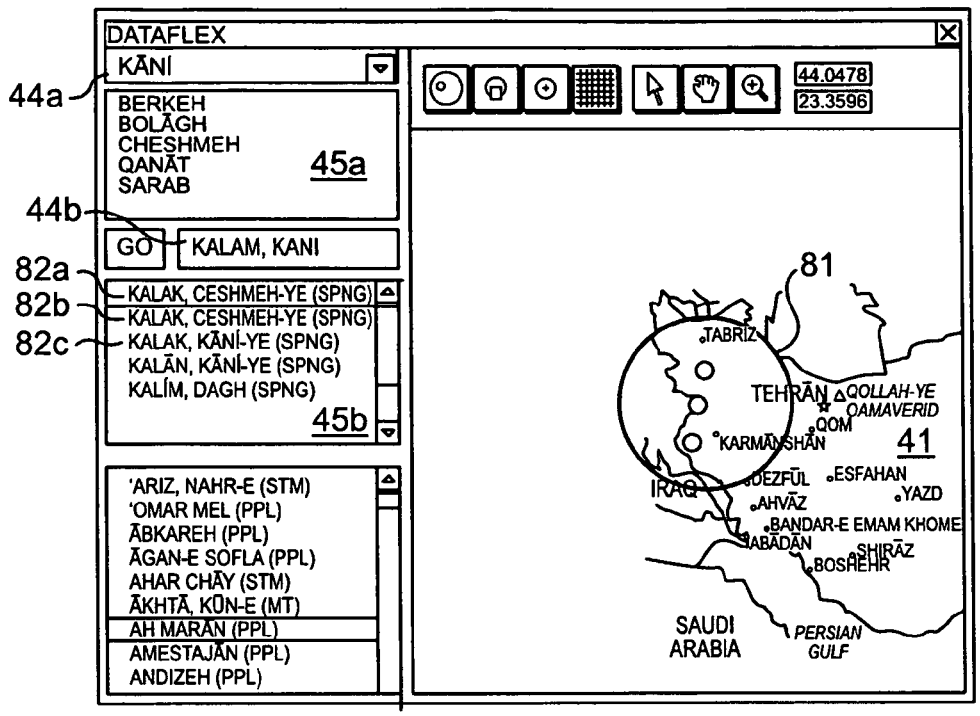
FIG. 8 is a screenshot similar to FIG. 7, but illustrating entry of another query name, kalam and type, kani, with search results.

FIG. 8 illustrates a search 44b for all "kani" (springs) with a name similar to "kalam." Results display area 45b shows five results. However, there are only three locations on the map 41 within the large circle 81 because one geographic feature "kaiak" goes by three variant names 82a, 82b, and 82c. Generic display area 45a lists all synonyms for "kani" (spring) found in database.

Figure 9:
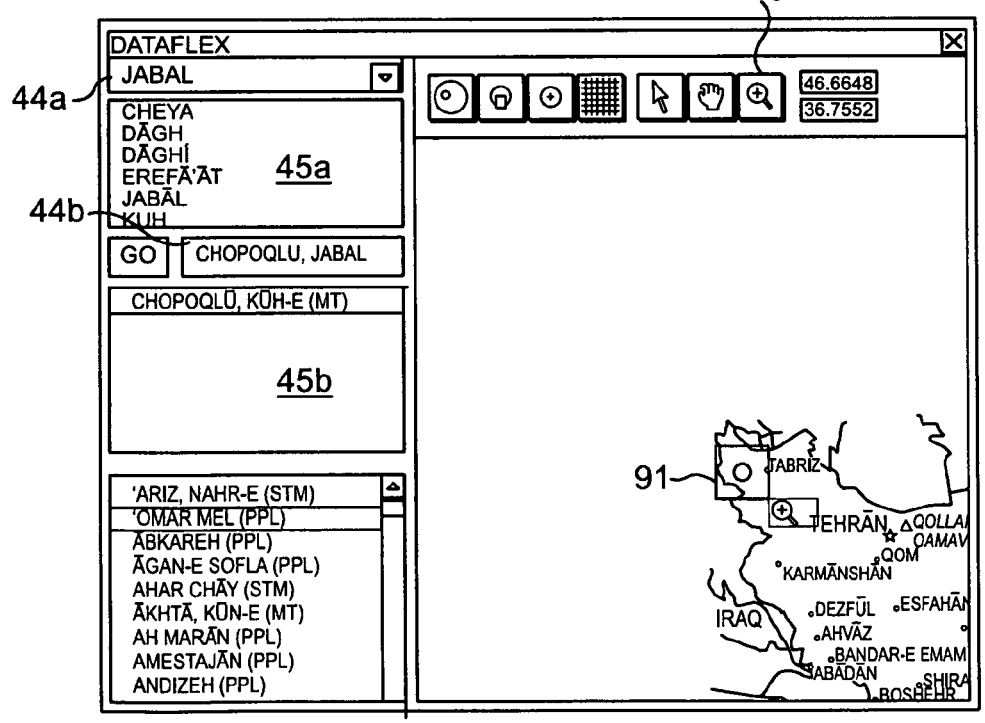
FIG. 9 is a screenshot similar to FIG. 7, but illustrating entry of another query name, chop and type, jabal, including an illustration of the use of a bounding rectangle.

FIG. 9 illustrates a different search for a "jabal" (an Arabic word for mountain) by the name of "chopoglu". In this case, only one geographic name was found and displayed in Results box 45b meeting this criterion. Using the Rubber Box button 42g, the user can outline a bounding rectangle 91 for zooming on map 41.

Figure 10:
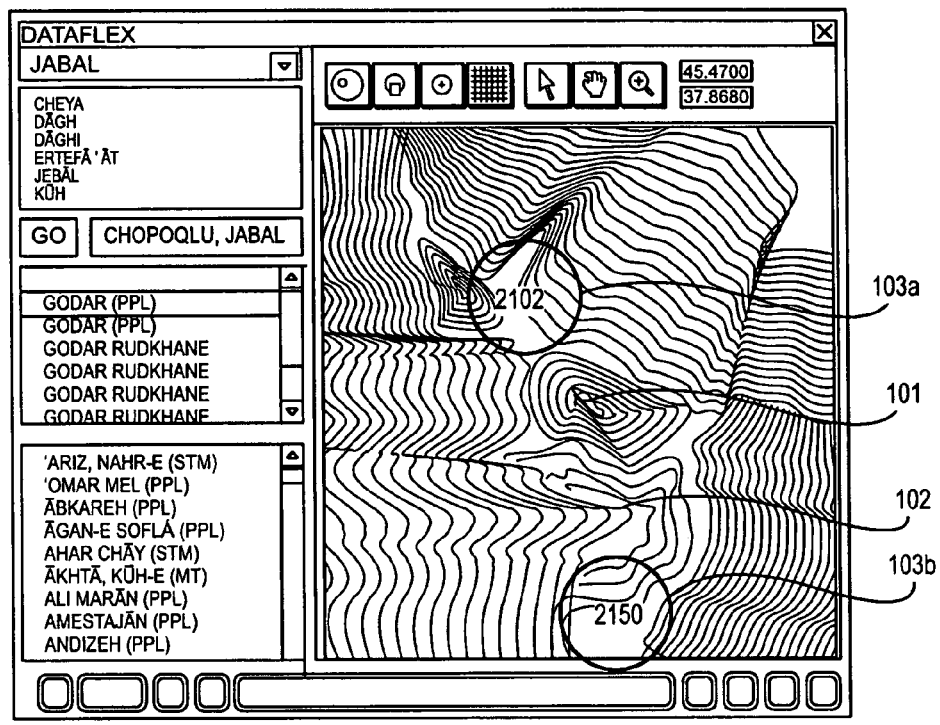
FIG. 10 is a screenshot following FIG. 9 illustrating a zoom with topographic and native language script names displayed.

FIG. 10 is a screenshot following FIG. 9 illustrating a zoom with location 101, the native language script name 102 and nearby elevations 103a and 103b displayed;

FIGS. 11-16 are flowcharts of some of the computer software used in generating FIGS. 4-10.

Figure 11:
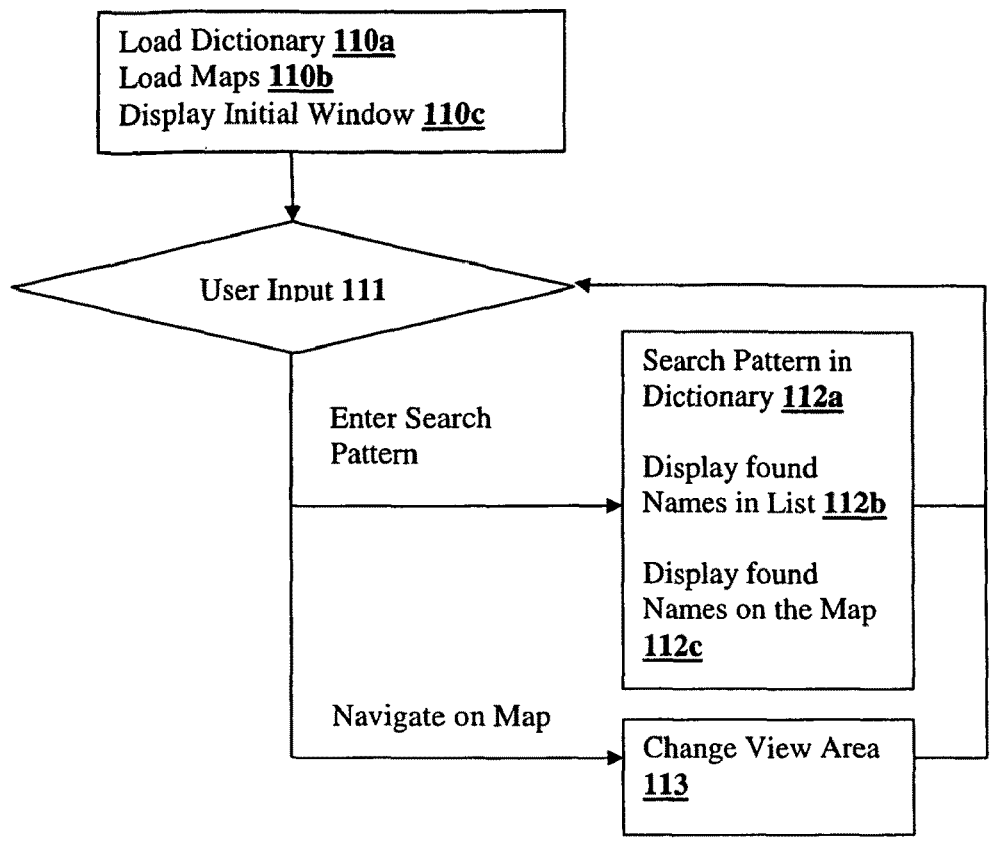
FIG. 11 is a flowchart showing the main software routine.

FIG. 11 is a flowchart showing the main routine. Before any user inputs, the first steps are: 1) 110a load a dictionary of feature names and types into memory, 2) 110b load maps with names of geographic features, and 3) 110c display an initial window showing a map and having boxes for inputting user commands, see FIG. 4, discussed above. At step 111, the user provides various inputs as discussed above to establish a character search pattern. The program: 1) 112a searches the dictionary for matching patterns, 2) 112b displays found names as a list in Results box 54b, and 3) 112c displays the location of found names on the map 41. Based on this display, the user can enter a new search pattern and/or navigate over the map with a curser or by typing in coordinates. In response to navigation commands, the program changes the view area 113. (A new search pattern might also change the view area.)

Figure 12:
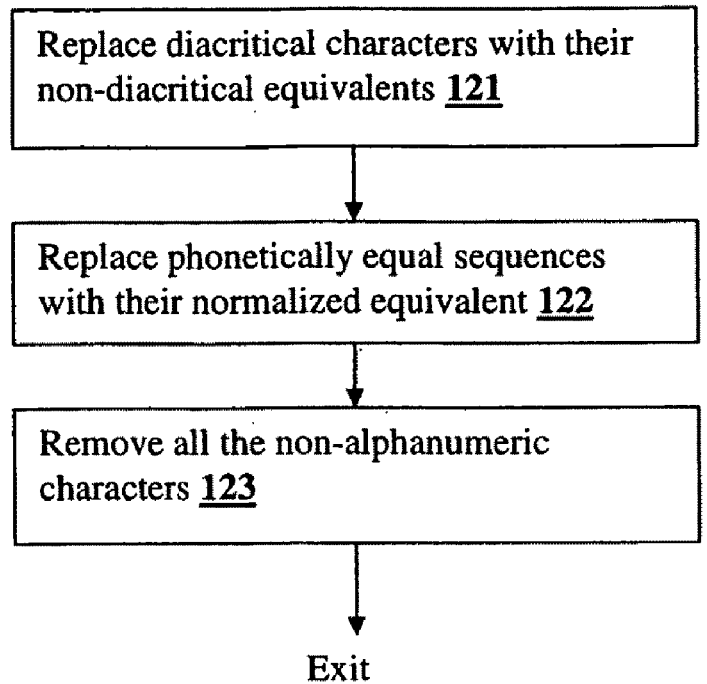
FIG. 12 is a flowchart illustrating how names in a dictionary are normalized according to various embodiments.

Before any dictionary searches are undertaken, all names in the dictionary are "normalized" as illustrated in FIG. 12 which shows three steps 121, 122, and 123. These steps replace diacritical characters with non-diacritical equivalents, replace phonetically equal sequences with normalized equivalents, and remove all non-alphanumeric characters, respectively. Also, any query names are normalized before a name search is started. Thus, the search compares normalized names against normalized names.

Figure 13:
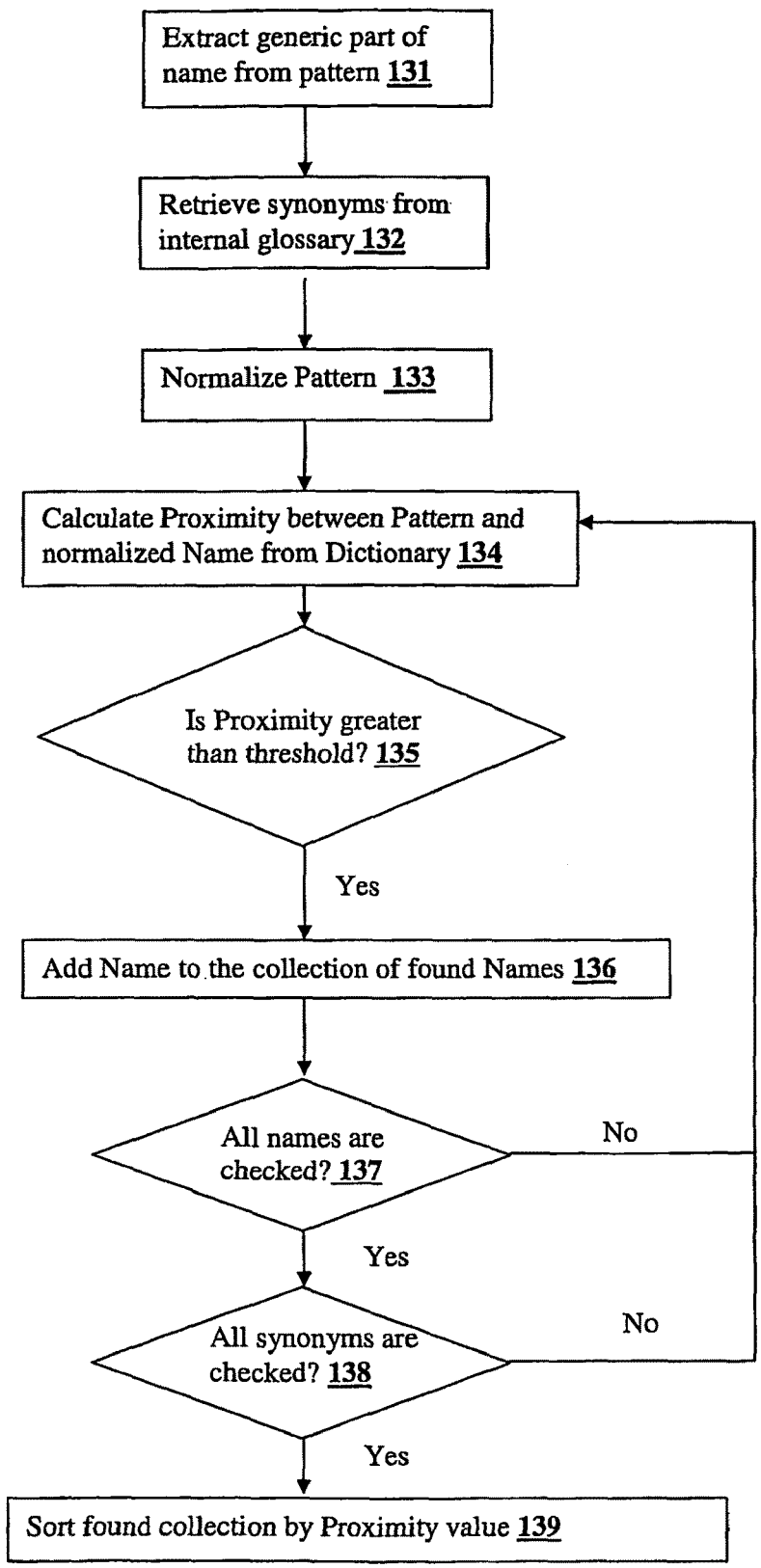
FIG. 13 is a flowchart outlining the basic search for a name in a dictionary.

FIG. 13 shows a flowchart outlining the basic search for a name in a dictionary. The first step 131 is to extract the generic part, if any, of the name from the user input search pattern. If there, the next step 132 is to retrieve synonyms for the generic from an internal glossary. The name is then normalized 133 as discussed above with respect to FIG. 12. The next procedure 134 is to calculate the proximity between the normalized search pattern and normalized names from the dictionary. The next step 135 determines if the proximity between a name in the dictionary and the search pattern is greater than a threshold set by the user. If Yes, it is added, step 136, to a collection of "found names." If not, it is not added and the program asks, step 137, whether all names in the dictionary have been checked. If No, the dictionary is searched further until all names have been checked. If Yes, step 138 asks if all synonyms for generics have been checked 138. If Yes, the collection of found names is sorted by proximity values 139 for display in results box 45b.

Figure 14:
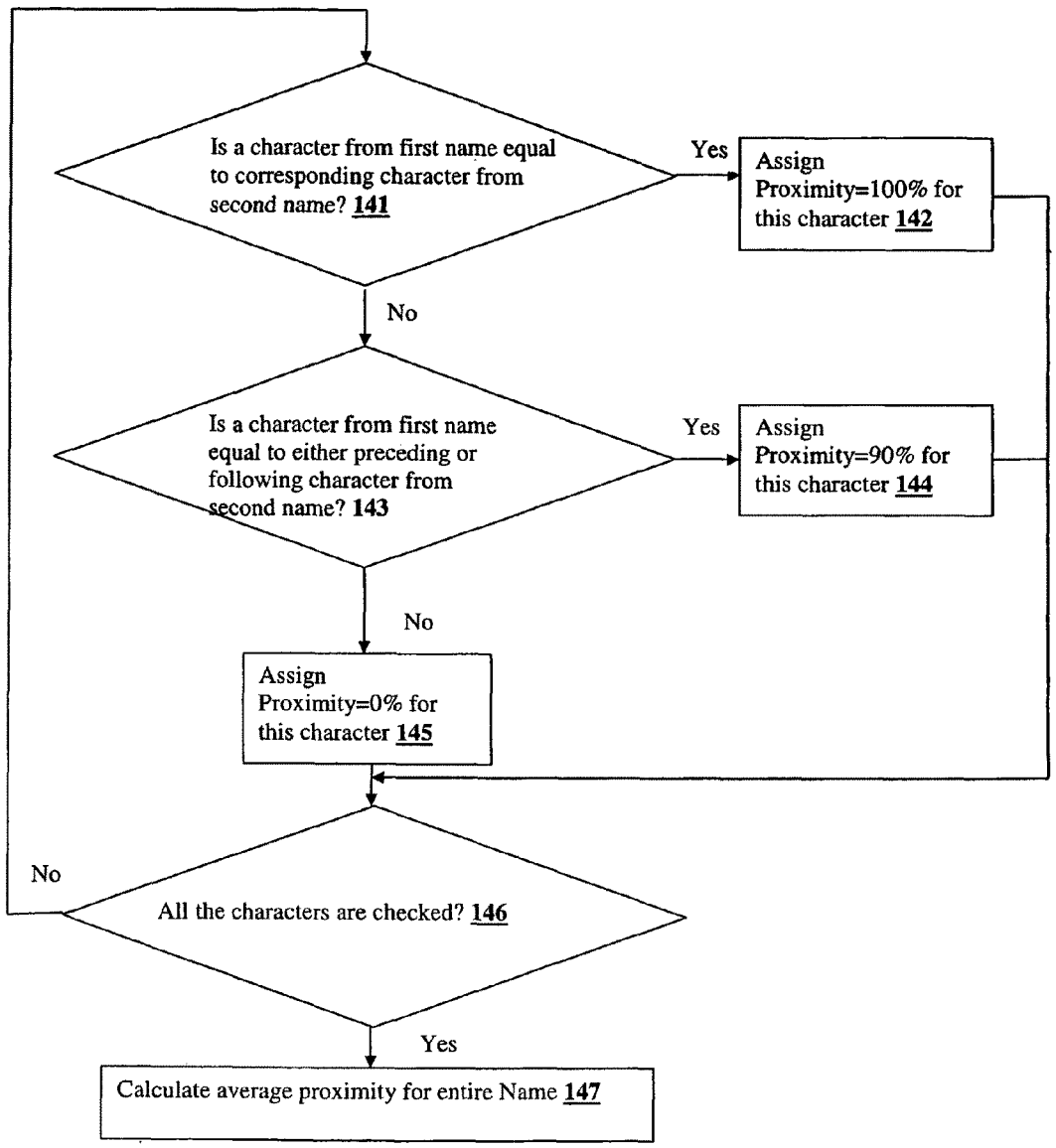
FIG. 14 is a flowchart illustrating how the proximity values (similarities) are calculated for any two names.

FIG. 14 illustrates how the proximity values are calculated for any two names, here designated a first name and a second name where each name consists of a normalized string of characters. Each character in the first name is compared to the corresponding character in the second name, character by character, as follows. The first step 141 is to ask if the first character in the first name is equal to the first character in the second name. For example, in KHAN and KAHN, the first characters are identical. If Yes, a proximity value of 100% is assigned 142 to these character positions and step 146 asks if all characters have been checked.

If No, the procedure loops back and checks the next character. If the result of step 141 is No, step 143 asks if the next character from the first name equals either the proceeding or following (for the first character, only the following is possible) character from the second name. For example, in KAHN and KHAN, the second character in KAHN equals the third character in KHAN. As a result step 144 assigns a proximity value of 90% and loops back to check the next (third) character. (Note that, once a character is checked, it is not checked a second time for a second possible proximity. For example, comparing AAA to AAA does not yield 100% of the exact match +90% for the matching adjacent characters, only 100%. Similarly comparing ABA with BAB does not yield 90%+90% for the second B, only 90%.) In the KAHN example, H will also yield a 90% proximity value. In the last pass, the fourth character, N yields a proximity value of 100%. At this point, step 146 results in a Yes, all characters checked.

The last step 147 is to calculate an average proximity value. This is found by summing the proximity values (100%, 90%, or 0%) for all characters in the name string and dividing by the length of the longest string, here 4.

Figure 15:
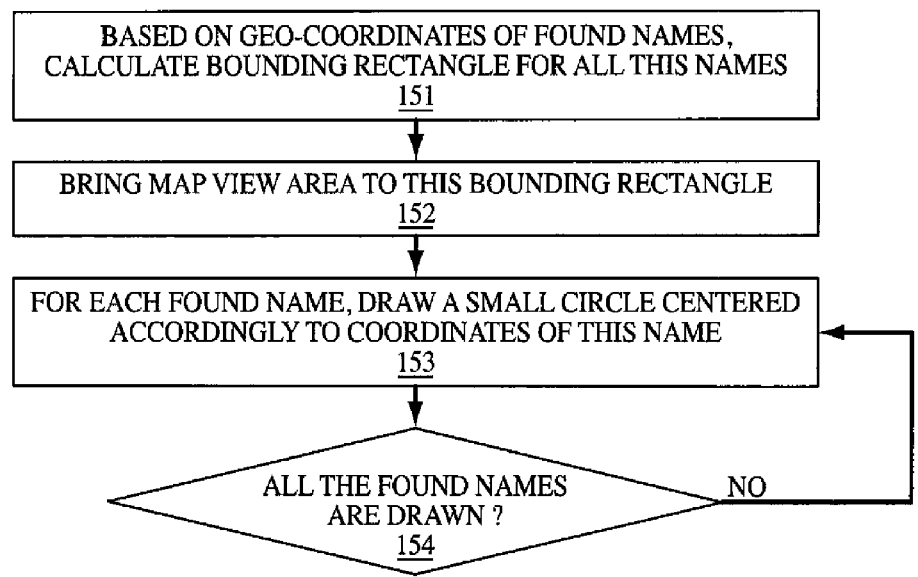
FIG. 15 is a flowchart illustrating software for handling the display of found names on the displayed map.

FIG. 15 is a flowchart illustrating the display of found names on the displayed map. At step 151, the program looks at the geographic coordinates of the found names and determines those two which are the smallest and largest in longitude and the smallest and largest in latitude. The four values determine the east-west and north-south extent of a boundary rectangle that would include all found names. At step 152, the map is enlarged to the size of this bounding rectangle. In cases where map sheets do not cover the entire rectangle, the display still fits those that are available out to the limits of the longest side.

Additionally, at step 153, the program looks at the first found name in a list of such and overlays a small circle centered on its geographic coordinates. At step 154, the program asks if each found name circle has been drawn. If No, the program loops back to look for more. If Yes, the program exits the subroutine.

Figure 16:
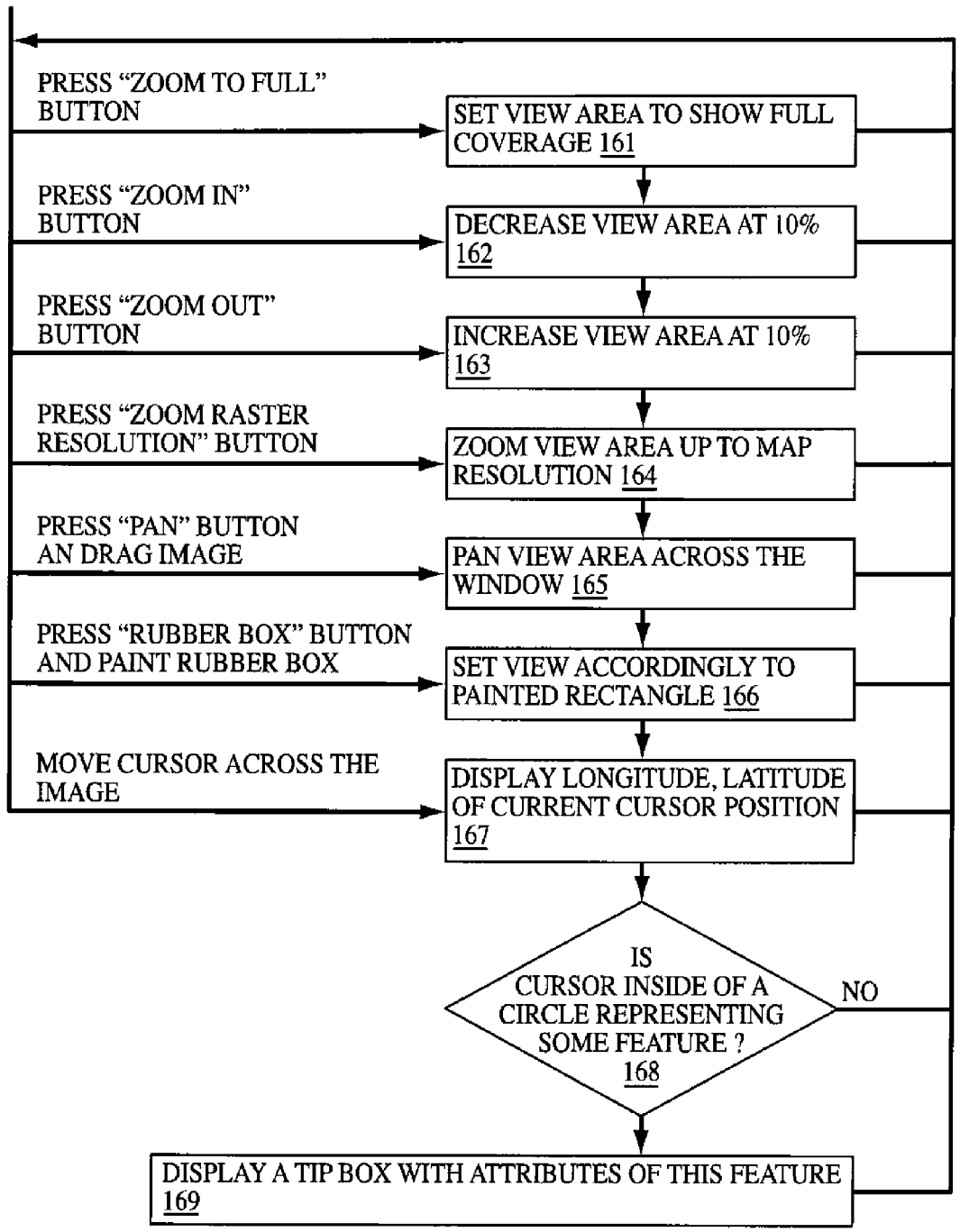
FIG. 16 illustrates a flowchart for changing the viewing area on the map display.

FIG. 16 illustrates a flowchart for changing the viewing area on the map display in response to user inputs, labeled as shown in the figure. Except where noted, the steps may be executed in any order. These operations are fairly straightforward to implement with routine programming and only the basic operations are described. At step 161, in response to pressing (on a touch screen or mouse clicking on an ordinary display) a "Zoom to Full" button, the program sets the view area to show the fullest available map coverage. After execution, the program loops back to wait for further inputs.

In response to a "Zoom In" input at step 162, the View area is decreased by 10% each time the button is pressed. The response to "Zoom Out" at step 163 is similar. Pressing the "Zoom Raster Resolution" button at step 164, causes the View area to use the map resolution in the center of the display. If no map coverage is available for the center, this button is disabled.

At step 165, the View Area can be panned by pressing the "Pan" button and using the mouse to drag the view area across the window. Moving the mouse cursor to an edge causes the off screen maps from that edge to slide to toward the center of the View Area.

At step 166, pressing the "Rubber Box" button allows the view area to be set to correspond to a painted rectangle. After the button is pressed, the program looks for the position of the first mouse click, then in response to movement of the mouse, outlines a rectangle in the view area. Releasing the mouse click button indicates that the rectangle is drawn and causes the view area to expand to the limits of the rectangle and the program loops back to wait for further inputs. Implementing other methods of drawing rectangles should be routine.

Lastly, at step 167, if none of the input buttons are pressed, the program keeps track of movement, if any, of the mouse cursor across the view area and updates the display of the longitude and latitude of the cursor position in Box 43a and 43b, respectively. After updating, at step 168, the program detects whether the cursor is inside a small circle generated previously that represents a geographic feature. If No, the program loops back to monitor any button inputs. Otherwise, the program displays 169 a "Tip Box," which lists attributes of this geographic feature. These attributes include feature name and designation code, however any other geographic attributes included in the database such elevation, population code, or feature name in native script.

The principles, preferred embodiments and modes of operation of the present invention have been described in the foregoing specification. However, the invention to be protected is not limited to the particular embodiments disclosed. The embodiments described herein are illustrative rather than restrictive. Variations and changes may be made, and equivalents employed, without departing from the spirit of the present invention. For example, the invention may be applied not just to human beings but also to animals. Accordingly, it is expressly intended that all such variations, changes and equivalents which fall within the spirit and scope of the present invention as disclosed and claimed be embraced thereby.

What is claimed is:

1. A method, implemented at least in part by a computer, of searching for geographic information, the method comprising the steps of:
   loading a dictionary of geographic feature names and geographic feature types into a memory communicably connected with the computer, wherein the loading is performed by the computer;
   loading locations associated with the geographic feature names into the memory, wherein the loading is performed by the computer;
   creating phonetic representations of the geographic feature names by normalizing each of the geographic feature names, wherein the creating is performed by the computer;
   storing the normalized geographic feature names in the memory;
   receiving, at the computer, a query for searching for geographic information, the query including a geographic name;
   creating a phonetic representation of the geographic name by normalizing the geographic name included in the query, wherein the creating is performed by the computer;
   searching the memory for a candidate name to be compared with the geographic name included in the query, the candidate name being one of the normalized geographic feature names;
   calculating a value of proximity between the candidate name and the geographic name included in the query, wherein the calculating is performed by the computer; and
   if the value of proximity is equal or larger than a predetermined value, outputting a geographic feature name corresponding to the candidate name and a location associated with the geographic feature name corresponding to the candidate name.

2. A method according to claim 1,
   wherein the step of normalizing each of the geographic feature names comprises the steps of:
   replacing a diacritical character in each of the geographic feature names with a non-diacritical equivalent character,
   replacing a string in each of the geographic feature names with a phonetically normalized equivalent string, and
   removing a non-alphanumeric character in each geographic feature name,
   and wherein the step of normalizing the geographical name included in the query comprises the steps of
   replacing a diacritical character in the geographical name included in the query with a non-diacritical equivalent character,
   replacing a string in the name included in the query with a phonetically normalized equivalent string, and
   removing a non-alphanumeric character in the geographical name included in the query.

3. A method according to claim 2, wherein the step of replacing a string in each of the geographic feature names with a phonetically normalized equivalent string includes the step of replacing a string in a geographic feature name which uses a character different from Latin alphabets with a phonetically equivalent normalized string which uses the Latin alphabets.

4. A method according to claim 1, wherein the step of outputting comprises identifying the location associated with the geographic feature name corresponding to the candidate name on a map.

5. A method according to claim 1, further comprising the steps of:
   extracting a geographically generic term from the geographic name included in the query;
   retrieving a synonym of the geographically generic term from an internal glossary;
   searching the memory for a candidate name which includes the synonym, the candidate name being one of the normalized the geographic feature names including the synonym;

calculating a value of proximity between a string other than the synonym in the candidate name and a string other than the geographically generic term in the geographic name included in the query; and if the value of proximity is equal or larger than the predetermined value, outputting a geographic feature name corresponding to the candidate name including the synonym and a location associated with the geographic feature name corresponding to the candidate name including the synonym, wherein a location associated with the geographic feature name corresponding to the candidate name including the synonym is identified on the map.

6. A method according to claim 5, wherein the step of calculating a value of proximity between a string other than the synonym in the candidate name and a string other than the geographically generic term in the geographic name included in the query comprises the steps of:

comparing characters in the string other than the geographically generic term in the geographic name included in the query with characters in the string other than the synonym in the candidate name, position by position;

determining a weight of each character in the string other than the synonym in the candidate name, wherein the weight determined for a given character in the string other than the synonym in the candidate name is based on a number of character positions between the given character and a matching character in the string other than the geographically generic term in the geographic name included in the query; and dividing a sum of weights of characters in the string other than the synonym in the candidate name by a number of the characters in the string other than the synonym in the candidate name.

7. A method according to claim 1, wherein the step of calculating a value of proximity between the candidate name and the geographic name included in the query comprises the steps of:

comparing characters in the normalized geographic name in the query with characters in the candidate name, position by position;

determining a weight of each character in the candidate name, wherein the weight determined for a given character in the candidate name is based on a number of character positions between the given character and a matching character in the normalized geographic name in the query; and dividing a sum of weights of characters in the candidate name by a number of the characters in the candidate name.

8. A method according to claim 1, further comprising the steps of:

obtaining a geographic coordinate of the candidate name; and determining a smallest longitude, largest longitude, a smallest latitude, and a largest latitude, wherein an area of the map is defined by the smallest longitude, the largest longitude, the smallest latitude, and the largest latitude and the area includes a location corresponding to the candidate name.

9. A method according to claim 8, further comprising the steps of:

receiving a command for changing a size of a viewing area of the map; and changing the size of the viewing area of the map according to the command for changing a size of a viewing area of the map.

10. A method according to claim 8, further comprising the steps of:

receiving a command for moving a viewing area of the map; and moving the viewing area according to the command for moving a viewing area of the map.

11. A method according to claim 8, wherein the candidate name is selected from a plurality of candidate names searched.

12. A system for searching for geographic information, the system comprising:

a computer; and a memory communicably connected to the computer, wherein the computer is configured for:

loading a dictionary of geographic feature names and geographic feature types into the memory;

loading locations associated with the geographic feature names into the memory;

creating phonetic representations of the geographic feature names by normalizing each of the geographic feature names;

storing the normalized geographic feature names in the memory;

receiving a query for searching for geographic information, the query including a geographic name;

creating a phonetic representation of the geographic name by normalizing the geographic name included in the query;

searching the memory for a candidate name to be compared with the geographic name included in the query, the candidate name being one of the normalized geographic feature names;

calculating a value of proximity between the candidate name and the geographic name included in the query; and if the value of proximity is equal or larger than a predetermined value, outputting a geographic feature name corresponding to the candidate name and a location associated with the geographic feature name corresponding to the candidate name.

13. A system according to claim 12, wherein the computer is further configured for:

replacing a diacritical character in each of the geographic feature names with a non-diacritical equivalent character, replacing a string in each of the geographic feature names with a phonetically normalized equivalent string, and removing a non-alphanumeric character in each geographic feature name, and wherein the computer is further configured for:

replacing a diacritical character in the geographical name included in the query with a non-diacritical equivalent character, replacing a string in the name included in the query with a phonetically normalized equivalent string, and removing a non-alphanumeric character in the geographical name included in the query.

14. A system according to claim 13, wherein the computer is further configured for replacing a string in a geographic feature name which uses a character different from Latin alphabets with a phonetically equivalent normalized string which uses the Latin alphabets.

15. A system according to claim 12, wherein the computer is further configured for identifying the location associated with the geographic feature name corresponding to the candidate name on a map.

16. A system according to claim 12, wherein the computer is further configured for:
   extracting a geographically generic term from the geographic name included in the query;
   retrieving a synonym of the geographically generic term from an internal glossary;
   searching the memory for a candidate name which includes the synonym, the candidate name being one of the normalized the geographic feature names including the synonym;
   calculating a value of proximity between a string other than the synonym in the candidate name and a string other than the geographically generic term in the geographic name included in the query; and
   if the value of proximity is equal or larger than the predetermined value, outputting a geographic feature name corresponding to the candidate name including the synonym and a location associated with the geographic feature name corresponding to the candidate name including the synonym,
   wherein a location associated with the geographic feature name corresponding to the candidate name including the synonym is identified on the map.

17. A system according to claim 16, wherein the computer is further configured for:
   comparing characters in the string other than the geographically generic term in the geographic name included in the query with characters in the string other than the synonym in the candidate name, position by position;
   determining a weight of each character in the string other than the synonym in the candidate name, wherein the weight determined for a given character in the string other than the synonym in the candidate name is based on a number of character positions between the given character and a matching character in the string other than the geographically generic term in the geographic name included in the query; and
   dividing a sum of weights of characters in the string other than the synonym in the candidate name by a number of the characters in the string other than the synonym in the candidate name.

18. A system according to claim 12, wherein the computer is further configured for:
   comparing characters in the normalized geographic name in the query with characters in the candidate name, position by position;
   determining a weight of each character in the candidate name, wherein the weight determined for a given character in the candidate name is based on a number of character positions between the given character and a matching character in the normalized geographic name in the query; and
   dividing a sum of weights of characters in the candidate name by a number of the characters in the candidate name.

19. A system according to claim 12, wherein the computer is further configured for:
   obtaining a geographic coordinate of the candidate name; and
   determining a smallest longitude, largest longitude, a smallest latitude, and a largest latitude,
   wherein an area of the map is defined by the smallest longitude, the largest longitude, the smallest latitude, and the largest latitude and the area includes a location corresponding to the candidate name.

20. A system according to claim 19, wherein the computer is further configured for:
   receiving a command for changing a size of a viewing area of the map; and
   changing the size of the viewing area of the map according to the command for changing a size of a viewing area of the map.

21. A system according to claim 19, wherein the computer is further configured for:
   receiving a command for moving a viewing area of the map; and
   moving the viewing area according to the command for moving a viewing area of the map.

22. A system according to claim 19, wherein the candidate name is selected from a plurality of candidate names searched.

* * * * *